United States Patent Office 3,098,084
Patented July 16, 1963

1

3,098,084
ANABOLIC ALKYLTHIO-STEROIDS
Klaus Brückner, Klaus Irmscher, and Josef Gillissen, Darmstadt, Germany, assignors to E. Merck Aktiengesellschaft, Darmstadt, Germany
No Drawing. Filed Jan. 29, 1962, Ser. No. 169,658
Claims priority, application Germany Feb. 2, 1961
3 Claims. (Cl. 260—397.4)

This invention relates to the preparation of novel steroid compounds having a high anabolic activity, and which can be effectively perorally administered.

Anabolic agents, sometimes called myotrophic agents, promote storage of protein and generally stimulate tissues, thereby being useful for the treatment of persons debilitated by various metabolic and endocrine disorders. Many of these anabolic agents also exhibit deleterious side effects, e.g. an androgenic effect which imparts masculine characteristics to females treated with these drugs. Furthermore, many of these anabolic agents cannot be effectively perorally administered to patients which, of cource, diminishes their practical value considerably.

A substantial amount of work has been conducted in the steroid field to obtain anabolic agents having satisfactory properties. For example, in U.S. Patent 2,908,694, there are disclosed certain 7-α-alkylthiotestosterone-derivatives. However, these drugs, though possessing a certain anabolic activity, are not as strong as desired, and furthermore, are nearly inactive when they are perorally administered.

The object of this invention, therefore, is to provide new steroid compounds having a high anabolic activity, being devoid of side effects, such as androgenic activities, and capable of being perorally administered.

Upon further study of the specification and appended claims, other objects and advantages of the present invention will become apparent.

To attain the objects of this invention, it has been unexpectedly discovered that compounds of Formula I, as follows, exhibit increased anabolic activities, and that these compounds can be efficiently perorally administered:

I wherein:
$R_1$ represents either a free or esterified hydroxyl group;
$R_2$ represents hydrogen or methyl;
$R_3$ represents an alkyl having 1–5 carbon atoms;
X represents two hydrogens; one hydrogen and a free or esterified hydroxyl group; or =O;
Y represents either hydrogen or fluorine;
Z represents two hydrogens or methylene; with the provision that of the substituents $R_2$, X, Y and Z, only up to three of said substituents can simultaneously represent hydrogen;
And the dotted line between carbon atoms 1 and 2 indicates the optional presence of a doubly bonded linkage.

Of the compounds expressed by Formula I, the following are preferred embodiments:

7α-ethylthio-17α-methyl-testosterone
7α-ethylthio-16-methylene-17α-methyl-testosterone

2

7α-ethylthio-11β-hydroxy-9α-fluoro-17α-methyl-testosterone
7α-methylthio-17α-methyl-testosterone
7α-methylthio-16-methylene-17α-methyl-testosterone
7α-methylthio-11β-hydroxy-9α-fluoro-17α-methyl-testosterone The novel compounds were tested on rats in the musculus levator ani test and in the seminal vesicle weight test (Hershberger et al., Proceedings of the Society for Experimental Biology and Medicine, vol 83, page 175 (1953)).

Dosages of 5, 10 or 25 mg. respectively, of the substance to be tested were perorally applied to castrated rats daily for seven days. For each dosage, the weight increase of the musculus levator ani was determined in comparison with untreated controls. The resultant weight increases of this muscle were then compared with those obtained by a corresponding dosage of a comparative substance 17α-methyl-testosterone. The mean value obtained from the three dosages represents the peroral anabolic effectiveness:

TABLE I

Peroral Anabolic Effectiveness

17α-methyl-testosterone (comparative substance) __ 1
1 - dehydro - 17α - methyl-testosterone (known substance) _____ 1.16
7α-methylthio-17α-methyl-testosterone _____ 1.21
7α-ethylthio-17α-methyl-testosterone _____ 1.57

In the same manner, the androgenic effect was determined from the weight increase of the seminal vesicle of the castrated rats, in comparison with 17α-methyl-testosterone. The index of the anabolic to the androgenic effect was determined in such a way that the values obtained for the anabolic effect in comparison with 17α-methyl-testosterone were divided by the values obtained for the androgenic effect in comparison to 17α-testosterone. The following table contains the mean value obtained from the three dosages:

TABLE II

Index of the Anabolic/Androgenic Effect

17α-methyl-testosterone (comparative substance) __ 1
1 - dehydro - 17α - methyl-testosterone (known substance) _____ 1.34
7α-ethylthio-17α-methyl-testosterone _____ 2.35
7α-methylthio-17α-methyl-testosterone _____ 2.67

In the case of a parenteral application, the ratio of the anabolic to the androgenic effect for 7α-methylthio-17α-methyl-testosterone was even 3 to 4 times more favorable than that of the known substance 19-nor-testosterone-17-(β-phenyl)-propionate.

The toxicity test for 7α-methylthio-17α-methyltestosterone resulted in a dosis lethalis$_{50}$ (DL$_{50}$) of 2.48 g./kg. if applied perorally. The chronic toxicity was tested on dogs for six weeks with a dose of 5 mg./kg. daily. No pathological results were observed.

The novel compounds are available in tablets of 5 mg. The initial dose for adults is 2–3 tablets; for a permanent treatment 1–2 tablets daily.

The novel compounds are suitable for all catabolic conditions, such as convalescence, high-degree emaciation, progressive muscle dystrophy and retarded growth in children.

To demonstrate the unexpected and highly advantageous properties of the compounds of this invention as compared to the compounds disclosed in U.S. Patent 2,908,694, the following table is presented:

| Tested compound | Anabolic effectiveness when administered | | Index of the anabolic/androgenic effect when administered | |
|---|---|---|---|---|
| | i.m. | subc. | i.m. | subc. |
| 7α-ethylthio-17α-methyl-testosterone | 1.42 | | 1.42 | 1.22 |
| 7α-ethylthio-testosterone-17-propionate | 1 | | 1 | 1 |
| 7α-methylthio-17α-methyl-testosterone | | 1.17 | | 1.15 |
| 7α-methylthio-testosterone-17-propionate | | 1 | | 1 |

The effectiveness was determined according to the methods described above. The applied daily doses were 0.2 and 1 mg.

It is to be noted that the essential advantage of the new compounds of the present invention is their effectiveness in peroral administration. When applied perorally, the compounds disclosed in U.S. Patent 2,908,694 show an activity which is not to be evaluated numerically. For anabolic preparations, however, the peroral administration is of outstanding importance.

The novel compounds of this invention are prepared by reacting an alkyl mercaptan having 1-5 carbon atoms with a compound corresponding to Formula II as follows:

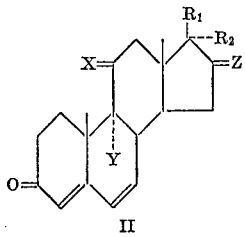

II wherein: $R_1$, $R_2$, X, Y and Z are the same as in Formula I.

By a smooth reaction, the alkyl mercaptans accumulate at the 6,7-double bond of the compounds of Formula II. In most cases, the alkyl mercaptan itself acts as a solvent; however, the reaction may also be conducted in the presence of an inert organic solvent, such as dioxane, benzene, dimethyl formamide or tertiary alcohols. It is preferable to add an alkaline catalyst, such as pyridine, piperidine, sodium methylate or sodium hydroxide. Furthermore, it is generally advantageous to heat the reaction components for a period of time or to reflux the reaction mixture to increase the rate of reaction. On the other hand, the reaction may, of course, also be conducted at room temperatures, wherein it is desirable to agitate the reaction mixture to maintain a satisfactory reaction rate.

The reactant alkyl mercaptans may be straight or branched, methyl and ethyl mercaptan being particularly suitable.

The resulting alkylthio derivatives may be dehydrogenated in the 1,2-position by conventional chemical or microbiological treatments. Particularly suitable dehydrogenation agents are 2,3-dichloro-5,6-dicyanobenzoquinone or selenium dioxide. If 2,3-dichloro-5,6-dicyano-benzoquinone is utilized, it is advisable to operate in the presence of a solvent having a boiling point of approximately 30–150° C., such as ethanol, butanol, tert. butanol, methyl acetate, dioxane, glacial acetic acid benzene, tetrahydrofuran, acetone, etc. It is advantageous to add small amounts of nitrobenzene to the reaction mixture. The times of reaction range between 5 and 48 hours, dependent on the particular solvent and base material utilized, and it is preferable to accomplish the reaction at the boiling temperature of the solvent utilized.

If selenium dioxide is utilized as the dehydrogenating agent, the solvents that can be employed are tert. butanol, ethyl acetate or tert.-amyl-alcohol. The reaction may be accelerated by adding small amounts of glacial acetic acid, and particularly good results are obtained if the reaction mixture is boiled at the reflux. The reaction is completed after approximately 12–48 hours. The selenium deposited is separated and the resultant 1,2-dehydrogenation product is isolated from the filtrate.

In the employment of a microbiological 1,2-dehydrogenation, various kinds of microorganisms may be utilized. Particularly suitable are *Bacillus sphaericus* var. *fusiformis*, *Corynebacterium simplex* and *Fusarium solani*. For the purpose of dehydrogenating, the base material is added to a submerged culture of the respective microorganism which grows according to the customary methods of fermentation technique, in a suitable nutrient solution at optimal temperatures and with thorough aeration. Employing an otherwise similar technique, suspensions of the microorganisms in a buffer solution may also be used, instead of growing cultures. The reaction is accomplished with the aid of chromatography and, after a total reaction of the base material, the fermentation solution is extracted with, e.g. chloroform.

If base steroids of Formula II comprising in the 16-position an exocyclic methylene group, are utilized, the 1,2-dehydrogenation, which may have to be performed, is accomplished microbiologically or with 2,3-dicyano-5,6-dichloro-p-benzoquinone.

Utilizing the foregoing reaction conditions as indicated, mainly when the reaction mixture is heated, ester groups which may be present will, in some cases, be saponified under the influence of the basic catalyst. On the other hand, the hydroxy groups present in the intermediate or final products may be esterified according to conventional methods. Suitable as esterification agents are all those acids or their functional acid derivatives which yield esters, particularly those which yield physiologically compatible esters; e.g., carboxylic acids, such as acetic acid, propionic acid, butyric acid, trimethyl acetic acid, cyclopentyl-propionic acid, phenylpropionic acid, phenylacetic acid, caproic acid, caprylic acid, palmitic acid, undecylenic acid, as well as benzoic acid and hexahydrobenzoic acid or halogenated carboxylic acids, such as, e.g., chloroacetic acid.

For the production of water-soluble derivatives, the 17-hydroxy group may be esterified with dicarboxylic acids, amino or alkylamino carboxylic acids or phosphoric or sulfuric acid, if desired. In this manner, there may be obtained, e.g.: succinates, oxalates or the acid addition salts of amino carboxylic acid esters, such as aspartic acid esters or diethyl amino acetic acid ester.

According to the invention, ester groups present in the intermediate or final products may, on the other hand, be saponified in a subsequent step in a conventional manner. A suitable saponification agent is, e.g., an aqueous solution of sodium bicarbonate, sodium carbonate or sodium hydroxide.

For the preparation of the starting compounds of Formula II, the corresponding Δ⁴-compounds are dehydrogenated in the 6-position of chloranil. In the same way, the 11-oxygenated compounds are available which are prepared from 17α-methyl testosterone or the 16-methylene derivative thereof (cf. Chemische Berichte, vol. 94, p. 2898) by microbiological hydroxylation in the 11-position and introducing, if desired, the 9α-fluoro substituent in the usual way via the 9,11-oxido compounds.

For purposes of illustration, the following preferred specific embodiments are presented. It is to be understood, however, that the products made, and the reaction conditions used are merely exemplary, and are not intended to be limitative of the specification, taken as a whole, and the appended claims.

EXAMPLE 1

5 g. of 6-dehydro-17α-methyl-testosterone are refluxed with 30 ml. of ethyl mercaptan and 3 ml. of piperidine for 28 hours. The reaction mixture is thereafter concentrated under reduced pressure and the 7α-ethylthio-17α-methyl-testosterone is recrystallized from ether. Melting point 176–177° C.; λ_max 241 mμ, $E_{1\,cm.}^{1\%}$ 428; $(\alpha)_D$ —55.2° (dioxane)

EXAMPLE 2

2 g. of 6-dehydro-17-α-methyl-testosterone are dissolved in 10 ml. of dioxane, reacted with 1 ml. of piperidine and, under cooling, with 10 ml. of methyl mercaptan and agitated at 35° C. in an autoclave for 24 hours. The reaction mixture is thereafter concentrated under vacuum and the 7α-methylthio-17α-methyl-testosterone is crystallized from methanol. Melting point 193–195° C.; $(\alpha)_D$—32° (dioxane); λ_max 240 mμ;

$E_{1\,cm.}^{1\%}$ 458

EXAMPLE 3

500 mg. of 6-dehydro-16-methylene-17α-methyl-testosterone are boiled under reflux in 30 ml. of ethyl mercaptan together with 3 ml. of piperidine for 28 hours. The reaction mixture is thereafter concentrated under reduced pressure and the 7α-ethylthio-16-methylene-17α-methyl-testosterone is recrystallized from ether. Melting point 223–224° C.; $(\alpha)_D$—133.3° (dioxane); λ_max 240.5 mμ;

$E_{1\,cm.}^{1\%}$ 438

EXAMPLE 4

1 g. of 9α-fluoro-11β-hydroxy-17α-methyl-6-dehydro-testosterone are refluxed together with 6 ml. of piperidine in 60 ml. of ethyl mercaptan for 30 hours. The reaction mixture is then concentrated under reduced pressure and the 7α-ethylthio-9α-fluoro-11β-hydroxy-17α-methyl-testosterone is recrystallized from ether. λ_max 239 mμ, $E_{1\,cm.}^{1\%}$ 378

EXAMPLE 5

According to Example 2, the 7α-methylthio-16-methylene-17α-methyl-testosterone is produced from 16-methylene 17α-methyl-6-dehydro-testosterone. λ_max 240 mμ, $E_{1\,cm.}^{1\%}$ 430

EXAMPLE 6

According to Example 2, the 7α-methylthio-9α-fluoro-11β-hydroxy-17α-methyl-testosterone is produced from 9α-fluoro-11β-hydroxy-17α-methyl-6-dehydro-testosterone. λ_max 238–239 mμ, $E_{1\,cm.}^{1\%}$ 420

EXAMPLE 7

According to Example 1, there are reacted 5 g. of 17α-methyl-11-oxo-6-dehydro-testosterone with 30 ml. of ethyl mercaptan to obtain 7α-ethylthio-11-oxo-17α-methyl-testosterone. λ_max 240 mμ, $E_{1\,cm.}^{1\%}$ 402

EXAMPLE 8

According to Example 1, 9α-fluoro-11β-hydroxy-6-dehydro-testosterone is converted to 7α-n-amlthio-9α-fluoro-11β-hydroxy-testosterone which is then further converted to 7α-n-amylthio-9αfluoro-11β-hydroxy-testosterone propionate by treatment with propionic anhydride in pyridine at room temperature. λ_max 239 mμ, $E_{1\,cm.}^{1\%}$ 311

In an analogous manner, 7α-n-amylthio-9α-fluoro-11β-hydroxy-testosterone is converted into the esters of e.g. the following acids: acetic acid, cyclopentyl propionic acid, cyclohexyl propionic acid, phenyl acetic acid, phenyl propionic acid, hexahydrobenzoic acid, undecylenci acid.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What we claim is:

1. Compounds of the formula:

wherein:
R₁ represents a member of the group consisting of a free and esterified hydroxyl group, said ester being physiologically compatible;
R₂ represents a member of the group consisting of hydrogen and methyl;
R₃ represents an alkyl group having 1–5 carbon atoms;
X represents a member of the group consisting of two hydrogens; one hydrogen and a member of the group consisting of a free and esterified hydroxyl group, said ester being physiologically compatible; and =O;
Y represents a member of the group consisting of hydrogen and fluorine;
Z represents a member of the group consisting of two hydrogens and methylene; and
with the provision that of the substitutents R₂, X, Y and Z, only up to three of said substituents can simultaneously represent hydrogen.

2. 7α-ethylthio-16-methylene-17α-methyl-testosterone.
3. 7α-methylthio-16-methylene-17α-methyl-testosterone.

References Cited in the file of this patent

UNITED STATES PATENTS

| 2,908,694 | Schaub et al. | Oct. 13, 1959 |
| 3,074,932 | Schaub et al. | Jan. 22, 1963 |

OTHER REFERENCES

Ringold et al.: J.A.C.S. 81, 1959, pages 427–431.